(12) United States Patent
Batel et al.

(10) Patent No.: US 8,984,070 B2
(45) Date of Patent: Mar. 17, 2015

(54) PERSONALIZED MESSAGING ON WEB INSERTS

(75) Inventors: Cécile Batel, Saint Quay Perros (FR); Emmanuel Gustin, Saint Quay Perros (FR); Claude Daloz, Lannion (FR)

(73) Assignee: Orange, Paris (FR)

( * ) Notice: Subject to any disclaimer, the term of this patent is extended or adjusted under 35 U.S.C. 154(b) by 216 days.

(21) Appl. No.: 12/969,118

(22) Filed: Dec. 15, 2010

(65) Prior Publication Data

US 2011/0145350 A1 Jun. 16, 2011

(30) Foreign Application Priority Data

Dec. 15, 2009 (FR) ...................................... 09 59020

(51) Int. Cl.
G06F 15/16 (2006.01)
H04W 4/00 (2009.01)
G06Q 30/00 (2012.01)
G06F 17/30 (2006.01)
G06Q 30/02 (2012.01)

(52) U.S. Cl.
CPC ............ *G06F 17/3089* (2013.01); *G06Q 30/02* (2013.01)
USPC ............................ 709/206; 455/466; 705/14.1

(58) Field of Classification Search
USPC ....................................................... 709/206
See application file for complete search history.

(56) References Cited

U.S. PATENT DOCUMENTS

| | | | |
|---|---|---|---|
| 7,523,387 B1 * | 4/2009 | Greenwald et al. ........... | 715/205 |
| 8,340,276 B1 * | 12/2012 | Sandoval ................. | 379/265.11 |
| 2004/0203958 A1 * | 10/2004 | Trevathan ..................... | 455/466 |
| 2005/0108095 A1 * | 5/2005 | Perlmutter ...................... | 705/14 |
| 2007/0204223 A1 | 8/2007 | Bartels et al. | |
| 2007/0276726 A1 * | 11/2007 | DiMatteo ......................... | 705/14 |
| 2008/0027799 A1 * | 1/2008 | Hao et al. ........................ | 705/14 |
| 2009/0030774 A1 * | 1/2009 | Rothschild et al. ............. | 705/10 |
| 2010/0223140 A1 * | 9/2010 | Bosan et al. ................ | 705/14.64 |
| 2010/0318507 A1 * | 12/2010 | Grant et al. .................... | 707/706 |
| 2010/0318894 A1 * | 12/2010 | Billharz et al. ................ | 715/234 |
| 2011/0179346 A1 * | 7/2011 | Dufour et al. ................. | 715/234 |
| 2011/0264644 A1 * | 10/2011 | Grant et al. .................... | 707/706 |
| 2012/0303756 A1 * | 11/2012 | Bolohan et al. ............... | 709/217 |

FOREIGN PATENT DOCUMENTS

WO 03034256 A1 4/2003
WO 2005003990 A2 1/2005

OTHER PUBLICATIONS

French Search Report dated Jul. 23, 2010 for corresponding French Patent Application No. 0959020, filed Dec. 15, 2009.

* cited by examiner

*Primary Examiner* — Emmanuel L Moise
*Assistant Examiner* — Mahran Abu Roumi
(74) *Attorney, Agent, or Firm* — David D. Brush; Westman, Champlin & Koehler, P.A.

(57) ABSTRACT

A method is provided for rendering a personal message sent by a sender for a recipient. The method includes: receiving the personal message by a processing software component of a server of a communications network; detecting, by the server, a connection of the recipient to an information rendering space; and replacing an advertisement insert display by the message subsequently to the connection of the recipient as a function of at least one rendering parameter accompanying the message.

7 Claims, 3 Drawing Sheets

PERSONALIZED MESSAGING ON WEB INSERTS

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of interpersonal communications. The disclosure pertains more specifically to the transmission of messages between users. More particularly, the disclosure pertains to the transmission of information messages to users in a communications network.

An information message can be distinguished from advertisement or spam type messages unsolicited by the user.

It is now common to transmit and receive messages. Such messages are generally transmitted in the form of formatted data exchanged between users of terminals that are linked up to communications networks that are themselves interconnected. The disclosure is aimed at proposing a novel method for transmitting information messages between a sender and an intended recipient to whom this message is sent.

BACKGROUND OF THE DISCLOSURE

Classically, a sender in a communications network has several solutions or solutions available when he wishes to transmit a message to an intended recipient through a communications network. A first solution, which is a basic solution, is that of calling the recipient through a telephone terminal and vocally imparting the information to be given to him. A second solution, which is equally classic but technologically more recent, consists of the transmission of an SMS (Short Message Service) type short message to a terminal of the intended recipient. The recipient can receive this message either through a mobile telecommunications terminal or a land-line communications terminal subscribing to a service for receiving such messages or again, through a personal computer. A third solution is a solution for transmitting an electronic mail message or email message to the intended recipient when he or she has a valid electronic mail (or email) address. In a fourth solution, a message is transmitted through an instantaneous messaging application.

A fifth solution which is currently very popular is that of transmitting messages through personal pages in social networks. Social networks of this kind such as Facebook™, Pikeo™, etc. enable users to belong to communities and transmit messages to all or part of the recipients belonging to any one of the communities to which the sender belongs. One of the main attractions of these social networks for the sender is that he has the greatest possible number of recipients available. It will be understood however that the number of messages sent to a recipient is very great and that it can be difficult for a recipient to distinguish between interesting and uninteresting messages.

Other solutions exist. There is however one characteristic common to all these solutions: it is difficult or even impossible in certain cases to enable reception by the recipient of a message, sent from a given platform, on a platform other than the one originally chosen. In other words, it is difficult for example to receive an SMS message sent from a mobile terminal on a PC that has no specific application or service. Similarly, it is difficult to receive an email message sent from a PC on a classic type of mobile terminal i.e., a simple terminal that can receive only SMS or MMS messages (i.e. a terminal that is not a smartphone). Now, it is true that many users have every means of message transmission and reception at their disposal (mobile terminals, land-line terminals, email messaging services, instantaneous messaging services). However, it is tedious for a recipient to have to check all these resources to find out whether or not a new message has been received.

Moreover, these message sending and receiving means are being increasingly clogged with unsolicited messages. For it is becoming increasingly difficult to avoid reception of advertisement messages for example. Electronic mailboxes are containing an ever increasing number of advertisement messages, so that it is becoming difficult to spot, among these advertisement messages, those messages truly sent to the recipient by a sender known to him or to her.

Thus, incidentally, the message has totally lost its value as a vector of data transmission between users since it is buried in a whole set of messages that are most frequently unsolicited by the recipient. In addition to the technological barriers that prevent messages from being transmitted from one platform to a terminal connected to another platform, the inventors have noted that the value of the message per se has truly diminished to the extent where certain recipients no longer even pay any attention to the messages that they might receive on such and such a platform. This is true of messages received by email which are increasingly being seen as an outdated vector for the transmission of information.

The inventors have thus observed that it is urgent to propose a novel means of message transmission and reception that can be used to emphasize a particular event so that the message is not diluted in the mass of messages received by the user.

SUMMARY

An exemplary embodiment of the disclosure does not have these drawbacks of the prior art. More particularly, an exemplary embodiment pertains to a method for rendering a personal message sent by a sender for a recipient.

According to an exemplary embodiment, such a method comprises:
  a step for receiving said personal message by means of a processing software component of a server of a communications network;
  a step for detecting, by means of said server, a connection of said recipient to an information rendering space;
  a step for replacing an advertisement insert display by said message subsequently to said connection of said recipient as a function of at least one rendering parameter accompanying said message.

Thus, an embodiment of the disclosure can be used to replace the display of advertisements in advertisement inserts by personal messages transmitted by senders. An embodiment of the disclosure thus provides for a novel way to view personal messages.

According to one particular embodiment, said method further comprises a step for creating said message comprising:
  a step for creating said at least one message;
  a step for selecting said at least one parameter of rendering said at least one message;
  a step for transmitting said at least one message accompanied by said at least one rendering parameter to a web service for managing personal messages connected to said communications network.

Thus, the sender of the message can check on the rendering of this message. Unlike the prior art techniques which do not ensure the way in which the message has been rendered, an embodiment of the disclosure provides the sender of the message with a greater degree of control over the rendering.

According to one particular embodiment, said at least one parameter of rendering of said at least one message belongs to the group comprising at least:
- a parameter of selection of at least one web service on which the sender wishes said message to be displayed;
- a temporal parameter;
- a parameter of visibility of said message;
- a parameter of notification of said message.

Thus, the sender is in a position to select the web service (for example a social network service), a temporal parameter (for example a date and/or a time and/or a duration of display), a parameter of visibility (to the recipient alone, the recipient and his or her contacts, or everybody) and/or know whether it is necessary to notify the recipient.

According to one particular characteristic, said method further comprises a step for processing said personal message by means of a web service for managing personal messages connected to said communications network, said step for receiving comprising:
- a step for recording said message;
- a step for identifying, as a function of said at least one rendering parameter, at least one server of said communications network having to render said message;
- a step for transmitting said message to said processing software component of said at least one server;

According to one particular characteristic, said step for processing said personal message by means of said web service for managing personal messages further comprises, prior to said step for transmitting said message, a step for adapting a format for rendering said message as a function of at least one parameter of display of advertisement inserts of said server.

Thus, the format of the message can be adapted to the format of display of the advertisements in advertisement inserts within servers which assume the task of displaying the personal message for the recipient.

In another embodiment, the disclosure pertains to a computer program product downloadable from a communications network and/or stored in a computer-readable carrier and/or executable by a microprocessor, and comprising program code instructions for the implementation of the above-mentioned method for rendering when said program is executed on a computer.

The disclosure also pertains to a server for processing a personal message sent by a sender for a recipient. According to an embodiment of the disclosure, such a server comprises:
- means for receiving said personal message by means of a processing software component;
- means for detecting a connection of said recipient to an information rendering space;
- means for transmitting a request for replacing an advertisement insert display by said message subsequently to said connection of said recipient as a function of at least one rendering parameter accompanying said message.

According to a particular embodiment, said server further comprises means for adapting a format of said message as a function of at least one advertisement insert display parameter.

In another embodiment, the disclosure also pertains to a system for processing a personal message. According to an aspect of the disclosure, such a system comprises:
- a communications terminal comprising means for composing and transmitting a personal message and comprising at least one parameter of rendering for a recipient;
- a personal message processing server comprising:
  - means for receiving said personal message by means of a processing software component;
  - means for transmitting a request for replacing a display of an advertisement insert by said message subsequently to said connection of said recipient as a function of said at least one rendering parameter accompanying said message;
- a server for rendering said personal message comprising:
  - means for receiving said replacement request;
  - means for detecting a connection of said recipient to an information rendering space;
  - means for replacing a display of an advertisement insert by said message subsequently to said connection of said recipient as a function of said at least one rendering parameter accompanying said message.

Thus, an embodiment of the disclosure makes it possible to have available a system for processing personal messages composed by senders to enable the display of advertisement inserts to be replaced by messages coming from users of the communications network.

BRIEF DESCRIPTION OF THE DRAWINGS

Other features and advantages shall appear more clearly from the following description of a preferred embodiment, given by way of a simple, illustrative and non-restrictive example, and from the appended drawings, of which.

DETAILED DESCRIPTION OF ILLUSTRATIVE EMBODIMENTS

Figure 1:
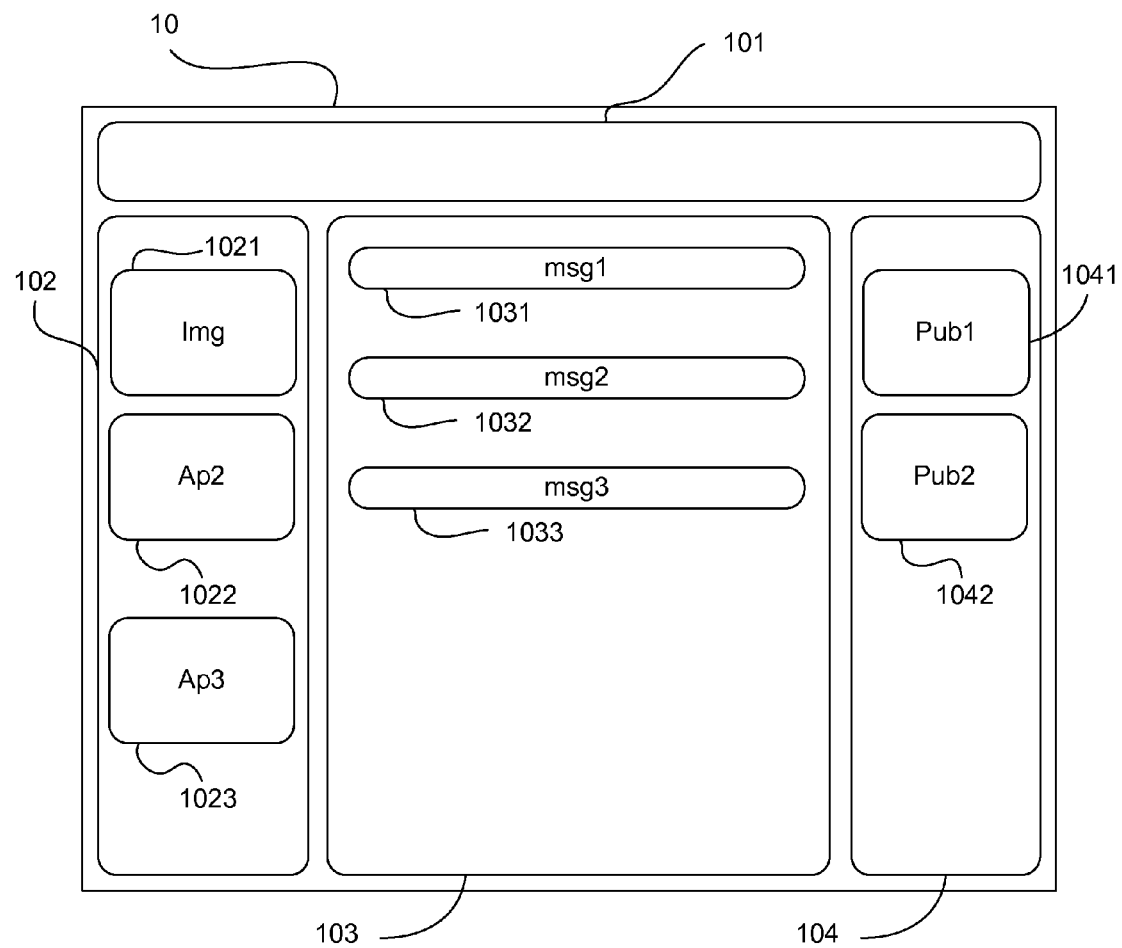
FIG. 1 is a schematic view of a web page of a user of a social network.

1. Reminder of an Illustrative the Principle of the Disclosure

An illustrative embodiment of the disclosure proposes to at least partially replace the display surface of a screen usually reserved for the display of advertisements (which moreover are unsolicited by the recipient) by a specific message coming from a sender. Thus, an embodiment of the disclosure makes it possible to mix the use of the information display surfaces of a screen and make available a new mean of disseminating a message. An embodiment of the disclosure is aimed at proposing a novel type of message which may be called an event-related personal message, the transmission vector of which is a surface of the screen of the recipient's terminal that is not habitually used to transmit messages.

According to one particular embodiment, the surface of the screen of the recipient's terminal is a surface generally used to display one or more advertisements, also called advertisement banners. Thus, an embodiment of the disclosure replaces the function of these advertisement inserts by a function that is more personal and more entertaining for the user. According to one particular characteristic, the duration of appearance of the sender's event-related personal message is limited in time so that the surface of the screen is not constantly dedicated to the display of event-related personal messages.

Thus the inventors have noted that when the event-related personal message (EPM) is displayed instead of an advertisement banner, the rate of viewing and response to subsequent advertisements, displayed after the display of the personal message has ended, is higher than it is when no personal message is displayed. Consequently, an embodiment of the disclosure paradoxically increases the rate of visibility of the advertisements messages displayed on the screens of the terminals even though the invention at least temporarily removes the display of these advertisements. Moreover, an embodiment of the disclosure also makes it possible to counter advertisement blocking steps which may be set up by the recipients. Indeed, there are many means by which a user can eliminate the advertisements displayed on the screen of a terminal. Thus, when the user utilizes an Internet browser on a personal computer or a fairly basic mobile terminal, it is possible to install an advertisement block within this browser. The main feature of such a block is that it prevents the display of contents coming from certain URLs (Uniform Resource Locators) from distributors of advertisements. Among such tools, we may mention Adblock™. Now, since event-related personal messages are displayed instead of advertisements, if the recipient wishes to access these personal messages, he is obliged to deactivate his advertisement block. Since this block is deactivated, the advertisement will be activated and the operator of the website on which the event-related personal messages are displayed will generate additional advertisement income.

The general principle therefore is to at least temporarily replace the display of advertisement messages by the display of event-related personal messages. Such replacement can be done in numerous instances and is not limited to the replacement of advertisements. It is thus possible to provide for the display of an event-related personal message on any type of information dissemination medium such as a television set, a mobile terminal, etc.

Here below, we shall present especially the case of an implementation of this replacement in social-network type applications. It is clear however that the present disclosure is not limited to this particular application but can also be implemented in many other cases, for example when the replacement is managed by an advertising agency platform such as GoogleAds™ and more generally whenever the objectives listed here below are worthwhile.

2. Description of an Embodiment

In this embodiment, we present the implementation of an embodiment of the disclosure by means of a social network application such as Facebook™. The principle of these social network applications is to enable users to remain in contact with recipients belonging to one or more groups of contacts. Referring to FIG. 1, we present a detailed drawing of the main characteristics of a personal page of such an application. The page 10 is divided into several distinct zones: a selection zone 101 enabling the selection of various parameters (name, profile, friends etc) of access to the user's account for the social network application. The page also contains a sub-applications zone 102 used to display a possible depiction of the recipient (1021), the user's various sub-applications (1022, 1023). The page contains a zone for displaying messages 103 in which the user's messages (1031, 1032, 1033) and those of his different contacts are displayed so that the user can simply view the messages left by his contacts as well as possible responses. Finally, the page contains an advertisement zone 104 displaying advertisements (e.g., Pub1, Pub2) for products or services in the form of advertisement banners (1041, 1042) which are generally clickable.

Figure 2:
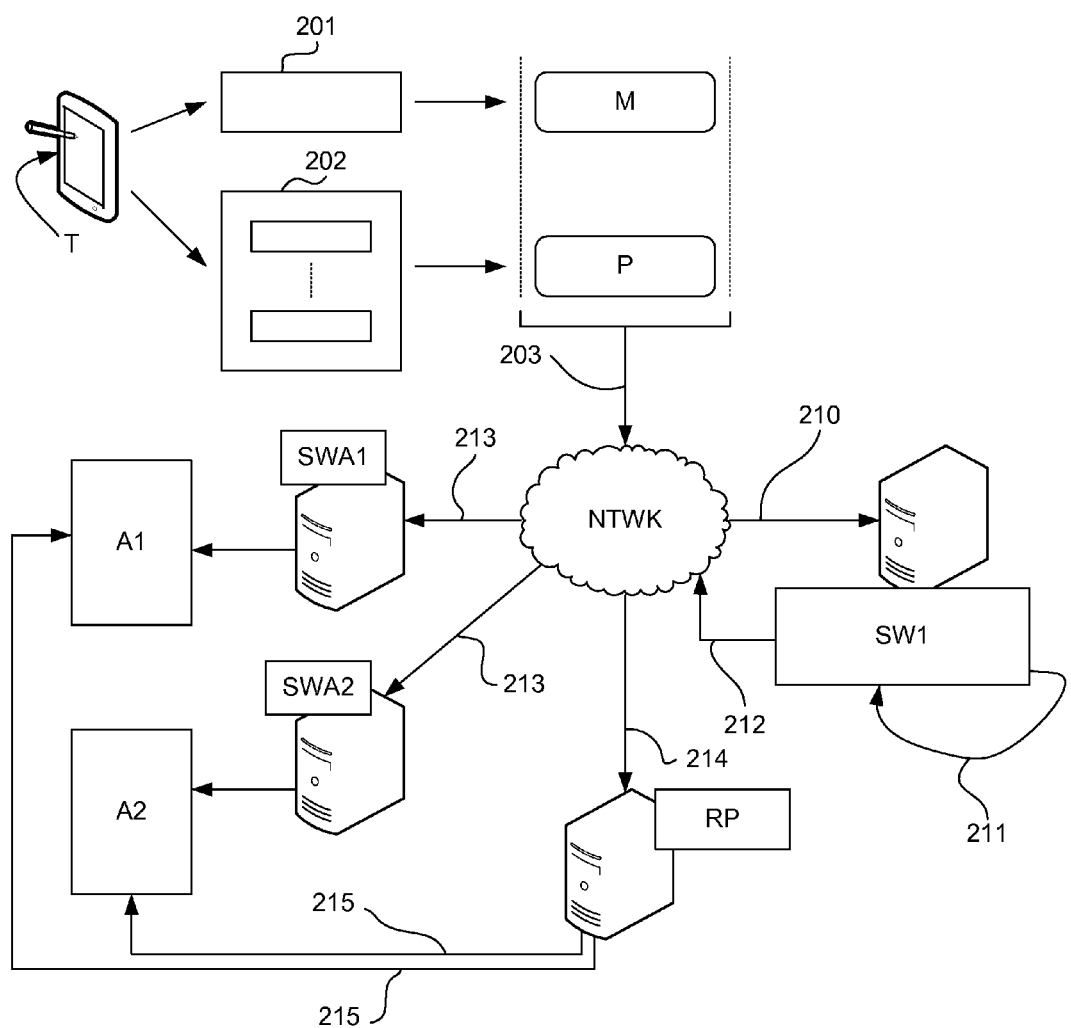
FIG. 2 illustrates an embodiment of the disclosure.

The object of an exemplary embodiment of the disclosure is to enable the display of a personal message in one of the advertisement banners (1041, 1042) of page 10. The method is described with reference to FIG. 2. To carry out the method, the sender who wishes to display such a message on the page of one of his correspondents, an intended recipient of the message, implements the method of this embodiment for:

composing the message (201), for example by means of a communications terminal T;

selecting (202), by means of an appropriate interface, a certain number of parameters for displaying the event-related personal message, such as for example:
 selecting one or more social network web services on which the sender wishes the event-related personal message to be displayed;
 selecting a date and/or a time when the event-related personal message should be displayed;
 deciding on the range of visibility of the event-related personal message: the recipient only, the recipient, and all his contacts; or everybody;
 selecting an option for notifying the event-related personal message by means of another communications channel (for example sending an SMS to the recipient to inform him that the event-related personal message is waiting for him on his page of the social network application selected by the sender).

transmitting (203) the message M, as well as its display parameters P to a web service type of service implemented on a server of the communications network NTWK.

For its part, the web service in question (SW1) installed on a processing server (not shown), receives (210) the event-related personal message as well as its parameters from the user. By means of the API (Application Programming Interface) it transmits (212) the message and its parameters to the appropriate services (SWA1, SWA2 etc) of the social network application or applications concerned (A1, A2, etc). This transmission can advantageously take the form of a request for replacement of a display of an advertisement insert by the message. The request then includes the message and the display parameters. This display may be an HTTP request containing the necessary data. The social network applications receive (213) the message and its parameters and take responsibility for displaying the message when the recipient logs in on one of these applications. Prior to this transmission, the web service (SW1) using resources made available by the processing server may carry out one or more modifications in the message (211) in order to adapt it to the specific characteristics of the social network applications selected by the user.

According to a specific embodiment, the web service SW1 transmits (214) the message and its parameters to an advertisement application (AA) responsible for displaying the message. Indeed, it often happens that social network applications do not themselves manage the advertisement banners displayed on the pages. The social network applications generally restrict themselves to specifying a display format for the advertisements. The advertisement application is often the transmission vector of the advertisement depending on its advertisers and depending, as the case may be circumstantially, on the action of the users or on the content of the messages present on the user's page. In such a situation, it is therefore appropriate to directly transmit the message to the advertising agency (RP) so it can display it (215).

Be that as it may, the display is made according to conditions specified by the user. In other embodiments, to compensate for possible loss of income due to the replacement of the advertisement by a personal message, the transmission of the personal message for display may be preceded by a payment on the part of the sender.

For the intended recipient of the message, after having received a preliminary alert message if any, for example an SMS message, he can view this message on the home page of his social network application. The display is prompted firstly as a function of parameters selected by the user when creating the message and secondly after authentication of the recipient so that he can access the social network application. Once the message has been consulted by the recipient (for example by clicking on it or at the end of a certain period of time), an acknowledgement is transmitted by the web service SW1 to the sender and then the advertisement insert resumes its original function: the message vanishes and is replaced by a conventional advertisement.

Although the present embodiment has been described with reference to messages requiring a display, the disclosure can also be implemented by means of a voice message which would be given when the recipient links up to the specified service.

For the sender of the event-related personal message, the advantage of this solution is that it proposes an innovative way of marking events by sending messages in an original manner.

For the service provider using the web service SW1, an embodiment of the disclosure is an ideal vector to convey a brand image through messages sent by users. It is indeed possible for the service provider SW1 to put his manufacturer's brand on the event-related personal messages so as to propose a link to a website dedicated to his service when the recipient clicks on the message in question.

For the host web service, for example the social network application, an embodiment of the disclosure provides an innovative, advanced communications function that pleases existing users and helps recruit new users.

According to one particular embodiment, the disclosure also pertains to a system for processing personal messages comprising:
  a communications terminal comprising means for composing and transmitting a personal message comprising at least one parameter for rendering to a recipient. This terminal is used by the sender to create the message and transmit it to the processing server accompanied by selected rendering parameters.
  a personal message processing server comprising:
    means for receiving said personal message by means of a processing software component;
    means for transmitting a request for replacing an advertisement insert display by said message subsequently to said connection by said recipient as a function of said at least one rendering parameter accompanying said message.
  This processing server has a role of an intermediate gateway platform between the user's terminal and the processing server. This server can also be responsible for invoicing the sender for this service.
  a rendering server for rendering said personal message comprising:
  means for receiving said replacement request;
  means for detecting a connection of said recipient to an information rendering space;
  means for replacing a display of an advertisement insert by said message subsequently to said connection of said recipient as a function of said at least one rendering parameter accompanying said message.

The rendering server and the processing server may be two logic servers installed within a same physical server. They may also be implemented on two separate physical servers.

Figure 3:
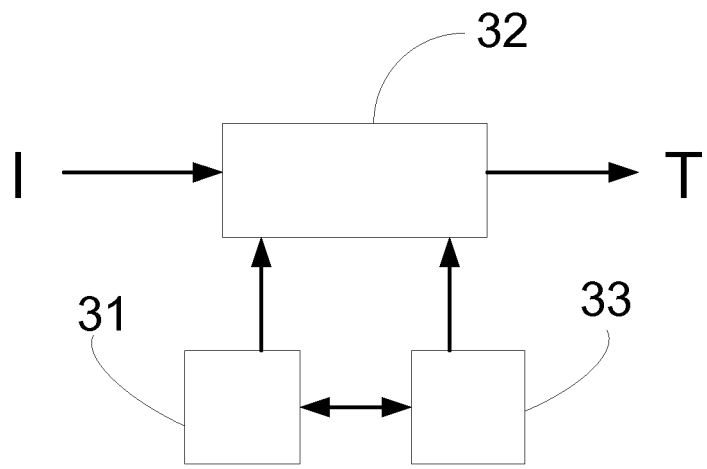
FIG. 3 illustrates the hardware architecture of a processing server according to an embodiment of the disclosure.

Referring now to FIG. 3, we present an embodiment of a processing device according to an embodiment of the disclosure. Such a device may be an applications server implementing one or more web services such as the one presented here above, which may interact with other communications network servers.

Such a device has a memory 31 consisting of a buffer memory, a processing unit 32, equipped for example with a microprocessor and driven by the computer program 33 implementing at least certain steps of the rendering method according to an embodiment of the disclosure.

At initialization, the code instructions of the computer program 33 are for example loaded into a RAM and then executed by a processor of the processing unit 32. The processing unit 32 inputs at least one piece of information I, such as neighborhood data coming from a routing apparatus. The microprocessor of the processing unit 32 implements some of the steps of the rendering method described here above, according to the instructions of the computer program 33, to deliver a piece of processed information T, such as the request for replacing the display of an advertisement insert. To this end, the device comprises, in addition to the buffer memory 31, means for receiving, by means of a processing software component, the personal message sent out by a sending user and means for detecting a connection of said recipient from an information rendering space.

These means are driven by the microprocessor of the processing unit 32.

Although the present disclosure has been described with reference to one or more examples, workers skilled in the art will recognize that changes may be made in form and detail without departing from the scope of the disclosure and/or the appended claims.

What is claimed is:

1. A method for rendering a personal message, the method comprising:
  a step of receiving the personal message by a processing software component of a server of a communications network, the personal message being sent by a sender terminal for a recipient terminal, wherein the sender terminal and the recipient terminal are terminals of users that are members of a group of user contacts;
  after receiving the personal message from the sender terminal, a step of detecting, by the server, a connection of the recipient terminal to an information rendering space of a host web service;
  a step of replacing, in a web page of the host web service, an advertisement insert display by the personal message, subsequently to the connection of the recipient terminal, as a function of at least one rendering parameter accompanying the personal message; and
  before the step of receiving the personal message, creating the personal message by the user of the sender terminal, wherein creating comprises:
    a step of the user of the sender terminal selecting through the sender terminal the at least one parameter of rendering the personal message; and
    a step of transmitting the personal message accompanied by the at least one rendering parameter from the sender terminal to a web service for managing personal messages and connected to the communications network.

2. The method according to claim 1, wherein the at least one parameter of rendering the personal message belongs to the group consisting of:
  a parameter of selection of at least one host web service on which the user of the sender terminal wishes the personal message to be displayed;
  a temporal parameter;
  a parameter of visibility of the personal message; and
  a parameter of notification of the personal message.

3. The method according to claim 1, wherein the method further comprises processing the personal message by a web service for managing personal messages connected to the communications network, the processing comprising:
- a step of recording the personal message;
- a step of identifying, as a function of the at least one rendering parameter, at least one server of the communications network having to render the personal message;
- a step of transmitting the personal message to a processing software component of the at least one server.

4. The method according to claim 3 wherein the processing of the personal message by the web service for managing personal messages further comprises, prior to the step of transmitting the personal message:
- a step of adapting a format for rendering the personal message as a function of at least one parameter of display of advertisement inserts of the at least one server.

5. A non-transitory computer-readable medium comprising a computer program product stored thereon, wherein the computer program product comprises program code instructions for executing a method for rendering a personal message, when the code instructions are executed by a computer, wherein the method comprises:
- a step of receiving the personal message and at least one rendering parameter by a processing software component of a server of a web service for managing personal messages in a communications network, the personal message and the at least one rendering parameter being sent by a sender terminal for a recipient terminal, wherein the sender terminal and the recipient terminal are terminals of users that are members of a group of user contacts;
- after receiving the personal message from the sender terminal, a step of detecting, by the server, a connection of the recipient terminal to an information rendering space of a host web service; and
- a step of replacing, in a web page of the host web service, an advertisement insert display by the personal message, subsequently to the connection of the recipient terminal, as a function of at least one rendering parameter accompanying the personal message, wherein before the step of receiving the personal message, the user of the sender terminal has created the personal message by:
- selecting through the sender terminal the at least one parameter of rendering the personal message; and
- transmitting the personal message accompanied by the at least one rendering parameter from the sender terminal to the web service for managing personal messages.

6. A server for processing a personal message, wherein the server comprises:
- a memory storing instructions; and
- a processor configured by the instructions to perform:
- receiving the personal message and at least one rendering parameter by a processing software component of the server, the personal message and the at least one rendering parameter being sent by a sender terminal for a recipient terminal, wherein the sender terminal and the recipient terminal are terminals of users that are members of a group of user contacts;
- detecting a connection of the recipient terminal to an information rendering space of a host web service after receiving the personal message from the sender terminal; and
- transmitting a request for replacing, in a web page of the host web service, an advertisement insert display by the personal message, subsequently to the connection of the recipient terminal, as a function of at least one rendering parameter accompanying the personal message, wherein before the server receives the personal message, the user of the sender terminal has created the personal message by:
- selecting through the sender terminal the at least one parameter of rendering the personal message; and
- transmitting the personal message accompanied by the at least one rendering parameter from the sender terminal to a web service for managing personal messages and connected to the communications network.

7. The server according to claim 6, further comprising means for adapting a format of the personal message as a function of at least one advertisement insert display parameter.

* * * * *